United States Patent
Vandenhende et al.

[11] Patent Number: 5,934,577
[45] Date of Patent: Aug. 10, 1999

[54] PROCESS FOR SEPARATING THE CONSTITUENTS OF A MUTLILAYER MATERIAL

[75] Inventors: Bernard Vandenhende, Leest; Jean-Marie Yernaux, Rixensart, both of Belgium

[73] Assignee: Solvay (Société Anonyme), Brussels, Belgium

[21] Appl. No.: 08/972,952

[22] Filed: Nov. 19, 1997

[30] Foreign Application Priority Data

Jul. 11, 1997 [BE] Belgium ................. 09700611

[51] Int. Cl.⁶ .................................................. B02C 19/12
[52] U.S. Cl. ............................................. 241/23; 241/24.28
[58] Field of Search .................. 156/344; 241/24.18, 241/24.28, 23, 24.14; 209/3

[56] References Cited

U.S. PATENT DOCUMENTS

| | | |
|---|---|---|
| 4,199,109 | 4/1980 | Watanabe . |
| 4,775,697 | 10/1988 | Schoenhard . |
| 5,366,091 | 11/1994 | Stahl et al. . |

FOREIGN PATENT DOCUMENTS

| | | |
|---|---|---|
| 0581089 | 2/1994 | European Pat. Off. . |
| 0587005 | 3/1994 | European Pat. Off. . |
| 4225977 | 1/1994 | Germany . |
| 08238440 | 9/1996 | Japan . |

*Primary Examiner*—Mark Rosenbaum
*Attorney, Agent, or Firm*—Venable; George H. Spencer; John W. Schneller

[57] ABSTRACT

Process for separating the constituents of a multilayer material including at least one layer of a base plastic (A) and a layer of a plastic (B) which are separated by a layer of adhesive plastic (C), in which: (1) the material is heated to a temperature T1 between the crystallization temperature of the plastic B (Tc) and Tc—20° C., (2) the material is next shredded by being subjected to shearing, at approximately the same temperature, so as to produce delamination and thus to convert the material into particles of small dimensions of two types, some (X) consisting essentially of base plastic (A) and others (Y) consisting essentially of plastic B and of adhesive plastic (C), and (3) the particles X and Y are subsequently separated by electrostatic separation.

14 Claims, No Drawings

PROCESS FOR SEPARATING THE CONSTITUENTS OF A MUTLILAYER MATERIAL

FIELD OF THE INVENTION

The present invention relates to the recycling of multilayer materials based on plastics. It relates more particularly to the separation of the constituents of a multilayer material including at least one layer of a base plastic and a layer of a barrier plastic which are separated by a layer of adhesive plastic.

TECHNOLOGY REVIEW

Such multilayer materials are commonly employed in very diverse industries, for example in the manufacture of packaging materials or of fuel tanks. An example of a multilayer fuel tank comprises 5 layers: PE/adhesive/EVOH/adhesive/PE, where PE denotes high density polyethylene and EVOH denotes an ethylene-vinyl alcohol copolymer, it being possible for the adhesive to be especially a polyethylene grafted with maleic anhydride (PE-g-MA).

SUMMARY OF THE INVENTION

During the manufacture of plastics-based articles, especially by blow extrusion, a large quantity of scrap is unavoidably produced (often more than 40%), the recovery of which is economically advantageous. The same is even more the case where whole substandard articles are rejected. In the case of multilayer materials the presence of several different plastics sometimes presents problems: if it is deemed sufficient to grind the multilayer material into particles and to reemploy them in the manufacture of a new article, the latter runs the risk of exhibiting mediocre mechanical performance and therefore the quantities of material thus recycled must be greatly restricted. It is therefore desirable to have available a simple and effective method enabling the constituents of multilayer materials to be separated with a view to being able to reemploy them in a manner which is comparable with virgin constituents, without affecting the performance of the new articles manufactured from constituents which are thus recovered.

A number of methods have already been proposed for this purpose. It is thus especially known to immerse multilayer materials in appropriate organic solvents (for example xylene) at elevated temperature, with a view to separating some constituents by selective dissolving. However, such a method requires the use of organic solvents, which are costly and generally present safety and environmental problems, and a subsequent drying which is costly in energy. In addition, even if the temperature of the solvent is raised, treatment periods of more than an hour are commonplace. These disadvantages are particularly marked when the articles to be treated are thick, for example fragments of fuel tanks. This is because a preliminary optional grinding generally does not make it possible to reduce the thickness of the particles obtained, and this is detrimental to the rate at which they dissolve. Such a solution is therefore not suited to the treatment of large quantities of material.

Consequently, the present invention aims to provide a process which is simple, fast and efficient, and which does not require large quantities of solvents to be employed.

DETAILED DESCRIPTION OF THE INVENTION

To this end the present invention relates to a process for separating the constituents of a multilayer material including at least one layer of a base plastic (A) and a layer of a plastic (B) which are separated by a layer of adhesive plastic (C), in which:

(1) the material is heated to a temperature T1 between the crystallization temperature of the plastic B (Tc) and Tc—20° C., (2) the material is then shredded by being subjected to shearing, at approximately the same temperature, so as to produce delamination and thus to convert the material into particles of small dimensions of two types, some (X) consisting essentially of base plastic (A) and others (Y) consisting essentially of plastic B and of adhesive plastic (C), and (3) the particles X and Y are subsequently separated by electrostatic separation.

Plastic is intended to denote any polymer or polymer mixture. The polymers in question are preferably thermoplastic. Each of the plastics (A, B, C) may in addition optionally contain one or several conventional additives such as stabilizers, lubricants, antioxidants, pigments, flame retardants, fillers or reinforcing fillers, and the like.

Good results have been obtained when the base plastic (A) represents more than 80% of the total weight of the plastics A, B and C, and in particular more than 90%.

The base plastic (A) is chosen as a function of the mechanical and/or chemical properties which the material must have. Conventional polymers such as polyolefins or vinyl chloride polymers are generally employed for this purpose. The process according to the invention gives good results when the base plastic (A) consists essentially of one or more polyolefins chosen from the homopolymers and copolymers of ethylene or of propylene, and in particular of high density polyethylene (HDPE).

The process according to the invention is found to be particularly advantageous and efficacious when the plastic B is a barrier plastic. A barrier plastic is intended to denote any plastic capable of forming a layer exhibiting a low permeability to particular fluids such as, for example, hydrocarbon-based fuels. Advantageous crystalline polymers which have such properties are especially polyamides, fluorine-containing polymers and ethylene-vinyl alcohol copolymers. The process according to the invention gives very good results when the plastic B consists essentially of one or more polymers chosen from polyamides and ethylene-vinyl alcohol copolymers, and very particularly of the latter. Plastic B often has a low adhesiveness to the conventional polymers of which the layer of base plastic generally essentially consists, and this often makes it necessary to resort to an adhesive plastic (C).

The adhesive plastic (C) is chosen as a function of the nature of the plastics A and B. A compatibilized polyolefin, and in particular compatibilized polyethylene is frequently employed as adhesive plastic (C). The compatibilization can be obtained especially by grafting, in particular by means of a carboxylic acid anhydride, for example maleic anhydride. The adhesive plastic (C) preferably consists essentially of a polyolefin grafted with maleic anhydride, in particular polyethylene or polypropylene grafted with maleic anhydride. When the base plastic (A) consists essentially of polyethylene or of polypropylene the adhesive plastic (C) is advantageously a grafted polymer of the same kind (PE or PP respectively).

Besides the abovementioned 3 layers A/C/B the multilayer material subjected to the process according to the invention may optionally include one or more other layers of identical or different nature. It may thus involve especially a material of symmetrical structure A1/C1/B/C2/A2, A1 and A2 denoting layers of base plastics which are identical or different (in nature as in thickness), and C1 and C2 denoting layers of adhesive plastics which are identical or different. It may further involve an asymmetric structure, for example of the A1/C/B/C/A2/A1 type. Another example is that of a material comprising several barrier layers, such as A/C/B/C/A/C/B.

Before the abovementioned stage (1) the process according to the invention may optionally include one or more conventional stages such as, for example, washing, or else chopping at ambient temperature, intended to reduce the material to fragments of medium dimensions (for example of the order of a few centimetres).

The heating (1) can be carried out by any known means, for example by means of lamps or resistances emitting infrared radiation. The purpose of this heating is to bring the material to a temperature which is suitable with a view to shredding (2).

Stage (2) of the process according to the invention consists in shredding the multilayer material at a specific temperature. Surprisingly, it has been found that the fact of subjecting the multilayer material to shearing forces at a temperature slightly lower than the crystallization temperature of the plastic B makes it possible to effect the separation of, on the one hand, A and, on the other hand B+C. It will be noted that the separation thus produced is original, insofar as the conventional methods of recycling multilayer materials comprising a barrier plastic have the objective of recovering the latter and otherwise yield a generally large quantity of a mixture of base plastic and of adhesive plastic, which is awkward to reexploit directly. In other words, an important characteristic of the process according to the invention is that it is a process which makes it possible to separate the base plastic from the other plastics. This is particularly advantageous insofar as, in the majority of cases, the base plastic (A) represents the mainvconstituent of the material by weight. Its recovery is therefore economically important. In fact, even though the barrier plastic is often more costly, it often represents only a small percentage of the total weight of the material. Thus, in the case of the 5-layer fuel tank described in the introduction, the weight of EVOH is generally of the order of 3 to 4% relative to the total weight of the tank.

Another advantage of the process according to the invention is that it can take place in relatively simple equipment, which must, nevertheless, permit the temperature of its contents to be precisely controlled. The material is preferably shredded in an impeller mill. This type of equipment is well known as such; it generally consists of a rotary drum provided with blades at its periphery, rotating in a vessel to which blades are also secured. A model capable of producing particles from approximately 5 to 12 mm in size is generally chosen, these specific dimensions making it possible to perform the separation with a high efficiency. It is furthermore advantageous that the knife blades with which the mill is provided should not be too cutting, otherwise the materials would be cut up without being subjected to significant shearing forces.

The equipment employed for the shredding (2) is preferably used in combination with means for thermal conditioning which make it possible to maintain the temperature therein within the abovementioned range. In general, the shredding produces additional heating of the material, with the result that it is often useful to cool the latter, for example with a stream of air at ambient temperature, in order to avoid clustering of the shredded particles. The same device is advantageously employed for cooling the particles and for removing them, by suction, out of the shredder.

Similarly, before carrying out the electrostatic separation (3) it may be useful to remove the fines :(microparticles) produced by the shredding; a conventional device such as an air classifier may be employed for this purpose.

The separation (3) of the particles X and Y is performed by electrostatic separation.

Within the electrostatic separation stage a first substage consists in charging the particles, for example by corona discharge or else by subjecting them to friction. This may involve mutual friction, for example in a fluidized bed, or else friction of the particles on a moving member (drum, belt or the like) of an appropriate nature (glass, plastic, or the like).

It is advantageous that after the shredding (2) the particles should be charged electrically, with a view to electrostatic separation, at a temperature (T3) of at least 50° C. In order to bring the particles into this temperature range—if they are not yet in it—it is possible in particular to employ a conventional heating device such as an infrared lamp. It is also possible advantageously to employ a charging equipment provided with heating elements such as electrical resistances. It has been found that when the charging of the particles was thus carried out at an elevated temperature, the selectivity of the subsequent electrostatic separation could be surprisingly improved. An advantage of this alternative method, in the context of the whole process according to the invention, is that at the end of the shredding (2) the particles are already at an elevated temperature, and this significantly reduces the energy required for the abovementioned heating, as well as the duration of this heating. Another advantage of this alternative method is that it allows the actual electrostatic separation to be performed with heating, and this has been found advantageous in the present context.

It is furthermore desirable that the substage of charging the particles should take place in an atmosphere of the lowest possible humidity. For this purpose a gas which has a low moisture content, for example dry air or an inert gas such as nitrogen, may in particular be injected into the charging equipment employed.

According to an alternative form which has been found advantageous in this context, after the shredding (2) the particles to be separated are charged electrically by being brought into contact with a movable member consisting essentially, at least superficially, of a plastic similar to the adhesive plastic (C). A plastic similar to the adhesive plastic (C) is intended to denote a plastic which exhibits similar triboelectric characteristics. The surface of the movable member preferably consists of a plastic identical with the adhesive plastic (C).

According to another advantageous alternative form, which may be combined with the preceding one, the particles to be separated are charged electrically by passing through a hollow rotary drum provided internally with components which are approximately perpendicular to its internal surface. Such components make it possible to intensify the friction of the particles on the internal surface of the drum, and this increases their electric charge. Examples of such components which may be employed are one or more rods, small plates and/or paddles which are approximately parallel to the axis of the drum. The drum is advantageously cylindrical in shape; it may, however, have a section other than circular, for example polygonal, in particular octagonal. The axis of the drum may be horizontal or slightly inclined so as to make it easier for the particles to travel forward from one end to the other. The angle of inclination and the speed of rotation of the drum allow the residence time of the particles within it to be adjusted.

Once they have been electrically charged, the particles can be easily separated, in a manner known per se, by falling between two deflecting electrodes exhibiting a continuous and high potential difference. According to a preferred alternative form the actual separation is performed by depositing the precharged particles on the external surface of a rotary drum whose axis is horizontal and which is connected to a terminal of a DC voltage source, the other terminal thereof being connected to a deflecting electrode consisting, for example, of a planar plate placed on the side of the said drum, parallel to its axis, generally at a distance of a few centimetres. In this way the particles carrying an electric charge of opposite sign to the deflecting electrode will be diverted towards the latter on falling from the drum, and this allows the particles to be separated according to their charge and hence according to their nature. It is preferred that the drum in question should at least superficially consist of an insulating material, for example of PVC, its internal surface being provided with electrically conductive means or coating ensuring a homogeneous distribution of the electric charges. The use of an insulating drum allows high electric fields to be obtained, of the order of 3 to 15 kV/cm, in contrast to the known processes employing a conductive drum, with which the electric field cannot exceed 2 or 3 kV/cm without leading to a risk of breakdown. In the process according to the invention, when employing an insulated separating drum, fields of 6 to 8 kV/cm have given very good results.

The electrostatic separation is preferably performed with heating, the particles being at a temperature of at least 50° C.

After separation of the particles X and Y the particles Y are advantageously subjected to a subsequent stage (4) of separation making it possible to collect, on the one hand, the plastic B and, on the other hand, the adhesive plastic (C). To give an example, if the plastic B consists of EVOH, it can be recovered by dissolving the Y particles in a water/alcohol solution, preferably with heating (for example a water/methanol mixture at 70° C.).

The present invention also relates to a process for recycling fuel tanks including at least one layer of a base plastic (A) and a layer of a barrier plastic (B) which are separated by a layer of adhesive plastic (C), or fragments of such tanks, in which the tanks or tank fragments are subjected to the process of separation defined above. As already indicated, this process can be applied particularly well to tanks in which the layer(s) of barrier plastic (B) consists (consist) essentially of EVOH, the layer(s) of adhesive plastic (C) consisting essentially of PE-g-MA.

EXAMPLE

Fragments of fuel tanks with 5 layers of the HDPE/PE-g-MA/EVOH/PE-g-MA/HDPE type were subjected to the process according to the invention. These fragments, the mean length of which was of the order of 10 to 20 cm, were first heated to approximately 150° C. and then shredded in an impeller mill (of Rapid®trademark, model 3026), at the same temperature. The particles thus obtained, of a mean size of approximately 8 mm, were next charged electrically by passing through a hollow rotary drum (length: 100 cm, internal diameter: 40 cm, speed of rotation: 30 to 70 rev/min) arranged horizontally, the internal wall of which was coated with PE-g-MA. The mean temperature within the drum was approximately 80° C. On leaving this first drum the particles were deposited on the upper generatrix of a second rotary drum, made of PVC (diameter: 40 cm, length: 40 cm, thickness: 10 mm, speed of rotation: 15 to 50 rev/min), the axis of which was arranged horizontally and perpendicularly to that of the first drum. A source of DC voltage (70 kV) was connected, on the one hand, to the metal coating applied to the internal surface of the second drum and, on the other hand, to a metal plate placed laterally facing the second drum, at a distance of 3 to 8 cm.

A number of trials were carried out, with mean particle throughputs of 30 to 120 kg/h.

The separation thus produced made it possible to collect, on the one hand, HDPE particles and, on the other hand, particles of EVOH/PE-g-MA mixture, and to do this with an excellent selectivity, since the HDPE thus recovered exhibited a purity of more than 99.5% by weight.

What is claimed is:

1. A process for separating the constituents of a multilayer material including at least one layer of a base plastic (A) and a layer of a plastic (B) which are separated by a layer of adhesive plastic (C), comprising steps for:

(1) heating the material to a temperature T1 between the crystallization temperature of the plastic B (Tc) and Tc—20° C., (2) shredding the material by subjecting the material to shearing, at approximately the same temperature, so as to produce delamination and thus to convert the material into particles of small dimensions of two types, some (X) consisting essentially of base plastic (A) and others (Y) consisting essentially of plastic (B) and of adhesive plastic (C), and (3) separating the particles X and Y by electrostatic separation.

2. The process according to claim 1, in which the base plastic (A) consists essentially of one or more polyolefins chosen from the homopolymers and copolymers of ethylene or of propylene.

3. The process according to claim 1, in which the plastic B is a barrier plastic.

4. The process according to claim 1, in which the plastic B consists essentially of one or more polymers chosen from polyamides and ethylene-vinyl alcohol copolymers.

5. The process according to claim 1, in which the adhesive plastic (C) consists essentially of a polyolefin grafted with maleic anhydride.

6. The process according to claim 1, in which, after the shredding (2), the particles are charged electrically, with a view to electrostatic separation, at a temperature (T3) of at least 50° C.

7. The process according to claim 1, in which, after the shredding (2), the particles to be separated are charged electrically by being brought into contact with a movable member having a surface consisting essentially of a plastic similar to the adhesive plastic (C).

8. The process according to claim 1, in which the particles to be separated are charged electrically by passing through a hollow rotary drum provided internally with components which are approximately perpendicular to its internal surface.

9. The process according to claim 1, in which, after separation of the particles X and Y, the particles Y are subjected to a subsequent stage (4) of separation making it possible to collect, on the one hand, the plastic B and, on the other hand, the adhesive plastic (C).

10. The process according to claim 1 wherein said multilayer material is a fuel tank or fragment of said tank including at least one layer of a base plastic (A) and a layer of a barrier plastic (B) which are separated by a layer of adhesive plastic (C).

11. A process for recycling a fuel tank or fragment of a fuel tank, including at least one layer of a base plastic (A) and a layer of a barrier plastic (B) which are separated by a layer of adhesive plastic (C), said base plastic (A) representing more than 80% of the total weight of plastics (A), (B), and (C), comprising steps for:

(1) heating the material to a temperature T1 between the crystallization temperature of the plastic B (Tc) and Tc—20° C., (2) shredding the material by subjecting the material to shearing, at approximately the same temperature, so as to produce delamination and thus to convert the material into particles of small dimensions of two types, some (X) consisting essentially of base plastic (A) and others (Y) consisting essentially of plastic (B) and of adhesive plastic (C), and (3) separating the particles X and Y by electrostatic separation.

12. The process according to claim 11, in which the base plastic (A) consists essentially of one or more polyolefins chosen from the homopolymers and copolymers of ethylene or of propylene.

13. The process according to claim 11, in which the plastic B consists essentially of one or more polymers chosen from polyamides and ethylene-vinyl alcohol copolymers.

14. The process according to claim 11, in which the adhesive plastic (C) consists essentially of a polyolefin grafted with maleic anhydride.

* * * * *